US009321417B1

(12) United States Patent
Lepper (10) Patent No.: US 9,321,417 B1
(45) Date of Patent: Apr. 26, 2016

(54) ATTACHMENT ARRANGEMENT FOR SIDE CURTAIN AIR BAG UTILIZING ROTATABLE FASTENER (71) Applicant: ILLINOIS TOOL WORKS INC., Glenview, IL (US)

(72) Inventor: Mark O. Lepper, Oak Park, IL (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

(21) Appl. No.: 14/532,342

(22) Filed: Nov. 4, 2014

Related U.S. Application Data (60) Provisional application No. 61/904,528, filed on Nov. 15, 2013.

(51) Int. Cl.
*B60R 21/20* (2011.01)
*B60R 21/232* (2011.01)
*B60R 21/213* (2011.01)

(52) U.S. Cl.
CPC .............. *B60R 21/20* (2013.01); *B60R 21/213* (2013.01); *B60R 21/232* (2013.01); *Y10T 24/303* (2015.01); *Y10T 24/304* (2015.01); *Y10T 24/42* (2015.01); *Y10T 24/4406* (2015.01)

(58) Field of Classification Search
CPC .... B60R 21/20; B60R 21/232; B60R 21/217; B60R 21/213; F16B 21/08; Y10T 24/44026; Y10T 24/42; Y10T 403/553; Y10T 24/304; Y10T 24/303
See application file for complete search history.

(56) References Cited

U.S. PATENT DOCUMENTS

| 5,368,427 | A  | * | 11/1994 | Pfaffinger | F16B 21/04 24/580.1 |
| 6,705,635 | B2 | * | 3/2004 | Hoeft | B60R 21/20 280/728.2 |
| 7,887,086 | B2 | * | 2/2011 | Kalandek | B60R 21/213 248/200 |
| 8,474,111 | B2 | * | 7/2013 | Ribes Marti | B60R 21/213 24/292 |

(Continued)

FOREIGN PATENT DOCUMENTS

WO  2014099685  6/2014

*Primary Examiner* — Drew Brown
(74) *Attorney, Agent, or Firm* — Joseph M. Butscher; The Small Patent Law Group, LLC (57) ABSTRACT

A quarter-turn fastener and hanger assembly for connection to a base plate having a fastener receiving receptacle, including a hanger bracket having a fastener receiving hole. The fastener includes a body rotatable between an insertion position for connection to the base plate and a locked position releasably securing said hanger bracket to the base plate having a head portion to move said fastener between the insertion position and the locked position, and an attachment portion sized to pass through the fastener receiving hole in the hanger bracket and the fastener receptacle in the base plate with at least one abutment surface to abut the back surface of the base plate in the locked position. The head portion includes deformable resilient arms extending laterally outward and toward said attachment portion with ends to engage a front face of said hanger bracket to urge said at least one abutment surface into abutting relation to the back surface of the base plate. The hanger assembly further includes a fabric member connected to the hanger bracket and to a supported element. In one form the hanger bracket includes forwardly bent tangs defining a locked position limit stop surface and a locked position retention limit stop surface with one of said deformable resilient arms abutting the stop surfaces to maintain the fastener in the locked position.

19 Claims, 7 Drawing Sheets

(56) References Cited

U.S. PATENT DOCUMENTS

| | | | | |
|---|---|---|---|---|
| 2005/0029778 A1* | 2/2005 | Weber | ................... | B60R 21/213 |
| | | | | 280/728.2 |
| 2007/0158931 A1* | 7/2007 | Baumgartner | .......... | B60R 21/20 |
| | | | | 280/728.2 |
| 2009/0285648 A1* | 11/2009 | Gosis | ...................... | B25B 31/00 |
| | | | | 411/22 |
| 2014/0017036 A1 | 1/2014 | Everard | | |
| 2015/0292541 A1* | 10/2015 | Risdale | ................ | F16B 19/002 |
| | | | | 29/525.01 |

\* cited by examiner

ATTACHMENT ARRANGEMENT FOR SIDE CURTAIN AIR BAG UTILIZING ROTATABLE FASTENER

CROSS-REFERENCE TO RELATED APPLICATION

This application claims priority pursuant to Title 35 USC §119(e) to provisional application Ser. No. 61/904,528 filed Nov. 15, 2013 for Attachment Arrangement for Side Curtain Airbag Utilizing Rotatable Fastener the entire specification and drawings of which are hereby incorporated by reference as if fully set forth herein.

BACKGROUND

This disclosure relates to utilization of energy absorbing rotatable fasteners for installation of supported elements such as curtain air bags in vehicles. More particularly, it relates to an improved installation assembly for a side curtain air bag.

Rotatable, energy absorbing, fasteners have been successfully employed in assembly processes involving installation of accessory equipment. One known application is the installation of curtain airbags into automotive vehicles.

Typically a suitable fastener for securement of a curtain air bag is a unitary plastic and metal structure insertable through appropriately formed apertures in an air bag retention tab and a vehicular body plate and rotatable ninety degrees (90°) to secure the tab to the vehicle. The fastener includes energy absorbing structure that absorbs energy of air bag deployment to minimize potential damage to the vehicular components.

Such fasteners possess numerous desirable features that make them particularly suitable for use. The rotatable fastener is easily inserted into the airbag tab and similarly inserted into a base plate on the vehicle frame. It is easily rotated to lock it into position to secure the airbag tab to the frame. Moreover, current designs of quarter-turn fasteners incorporate energy absorbing characteristics which absorb the energy of airbag deployment and minimize structural damage to the vehicle frame.

One such fastener is disclosed in International Publication No. WO 2012/129471 A2, published Sep. 27, 2012 entitled "Verification Arrangement for Fastener System" (US 2014/0017036 A1, published Jan. 16, 2014) the entire content of the specification and drawings of which are hereby incorporated by reference herein as if fully set forth.

The present disclosure provides a side curtain air bag attachment arrangement with enhanced overall performance satisfaction through ease of use, reduction of component complexity and improved installation quality.

SUMMARY OF DISCLOSURE

In particular, the arrangement disclosed includes structure that assures that the rotated fastener remain in a locked, energy absorbing position. It also reduces or eliminates buzz, squeak or rattle, between the curtain air bag hanger and vehicular base plate, undesirable properties of previously contemplated installations. It also simplifies the configuration of the air bag in relation to its attachment mechanism.

DETAILED DESCRIPTION OF ILLUSTRATED EMBODIMENTS

An improved attachment arrangement for a supported element illustrated as a side curtain air bag employing an energy absorbing quarter-turn fastener is shown in FIGS. 1 to 7. Seen in assembled form in FIG. 1, a curtain air bag 110 comprising a rolled inflatable fabric bag is supported by a hanger assembly 124 secured to a vehicle body by an energy absorbing quarter-turn fastener 149. The hanger assembly 124 includes a rigid hanger bracket 125 and fabric member 112.

Figure 1:
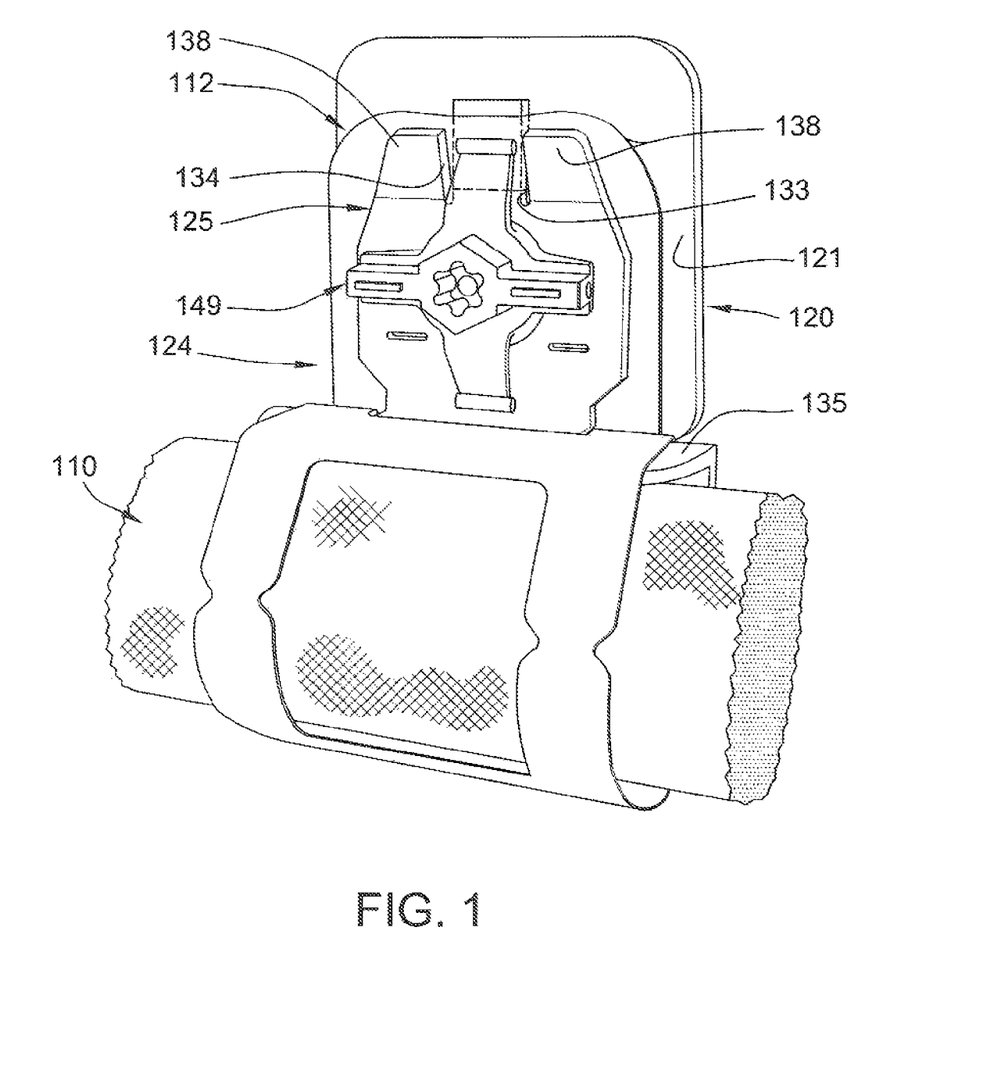
FIG. 1 is a perspective view of an installation of a vehicular side curtain air bag in accordance with the present disclosure.

In FIG. 1, the vehicle body structure is illustrated as a structural base plate 120, secured within a vehicle interior. It should be understood that base plate 120 may be an integral part of the vehicle body. Its illustration here as a separate element is for ease of description.

Figure 2:
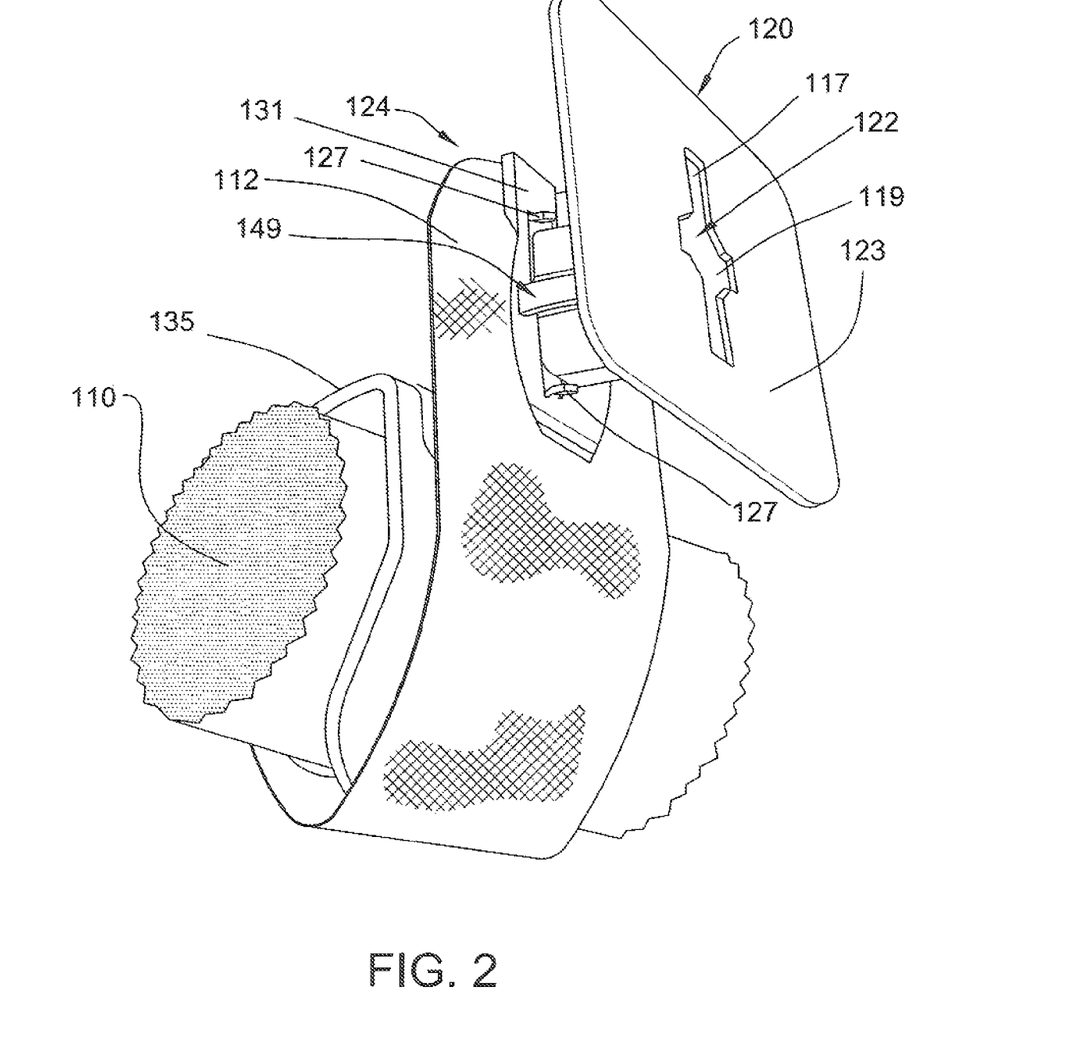
FIG. 2 is an exploded perspective view of the installation of FIG. 1.

Base plate 120 includes a front surface 121 against which the hanger assembly 124 is secured by fastener 149. As seen in FIG. 2, base plate 120 has a cruciform shaped hole 122 having an intersecting long slot 117 and short slot 119 to receive an inserted portion of the quarter-turn fastener 149 as is well known. Base plate 120 includes a rear surface 123 seen in FIG. 2 against which the energy absorbing portion of the fastener 149 reacts on air bag deployment as is also fully understood.

It should also be understood that throughout this specification reference to longitudinally means along a line in the direction of insertion, transverse means perpendicular to that line. Forward or front, and rearward or back, is in reference to the direction of insertion of the fastener into the receiving apertures. In this regard, front or forward is visible to the user or viewer and back or rearward is concealed.

Figure 3:
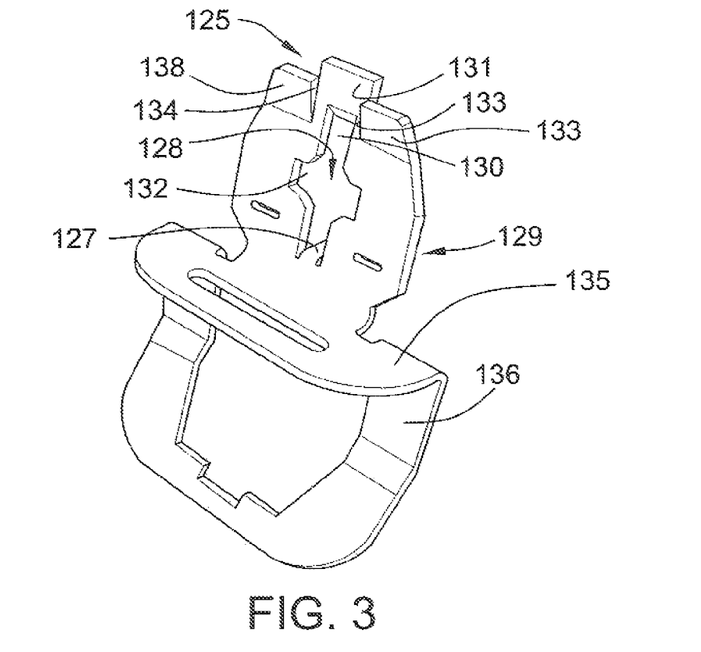
FIG. 3 is a front perspective view of the hanger bracket of the present disclosure.
Figure 4:
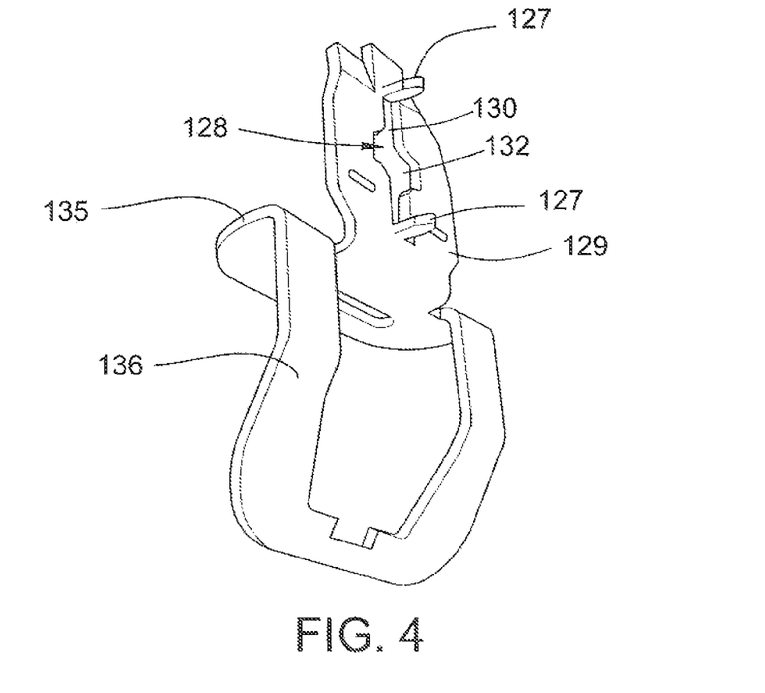
FIG. 4 is a rear perspective view of the hanger racket of the present disclosure.

Referring to FIG. 3, the hanger bracket 125 of hanger assembly 124 is a metal stamping. It includes a generally planar securement flange portion 129 having central cruciform shaped hole 128 with defined by intersecting long slot 130 and short slot 132. Tabs 127, seen in FIG. 4, extend inward, in the direction of fastener insertion, at the opposite distal ends of long slot 130. The aperture or hole 122 in base plate 120 is configured such that the opposite ends of the long slot 117 are shaped to receive inward directed tabs 127 on attachment of hanger assembly 124 to base plate 120 to fix the hanger assembly 124 against rotation relative to the base plate 120.

Referring to FIG. 3, securement flange portion 129 defines a hook 131, upward of the upper end of long slot 130. Securement flange portion 129 further defines forwardly directed limit stops comprising locked position limit stop surface 133 and locked position retention stop surface 134 formed by integral, forwardly bent tangs 138 positioned on opposite sides of hook 131.

Lower end of hanger bracket 125 includes integrally formed outwardly directed ledge portion 135 and a depending arm portion 136 generally aligned with securement flange portion 129. The ledge portion 135 and depending arm portion 136 defines a cradle to receive the air bag 110 as will be understood. These portions may be solid metal, or include stamped out voids, as illustrated, to reduce overall weight of the hanger bracket 125.

Figure 5:
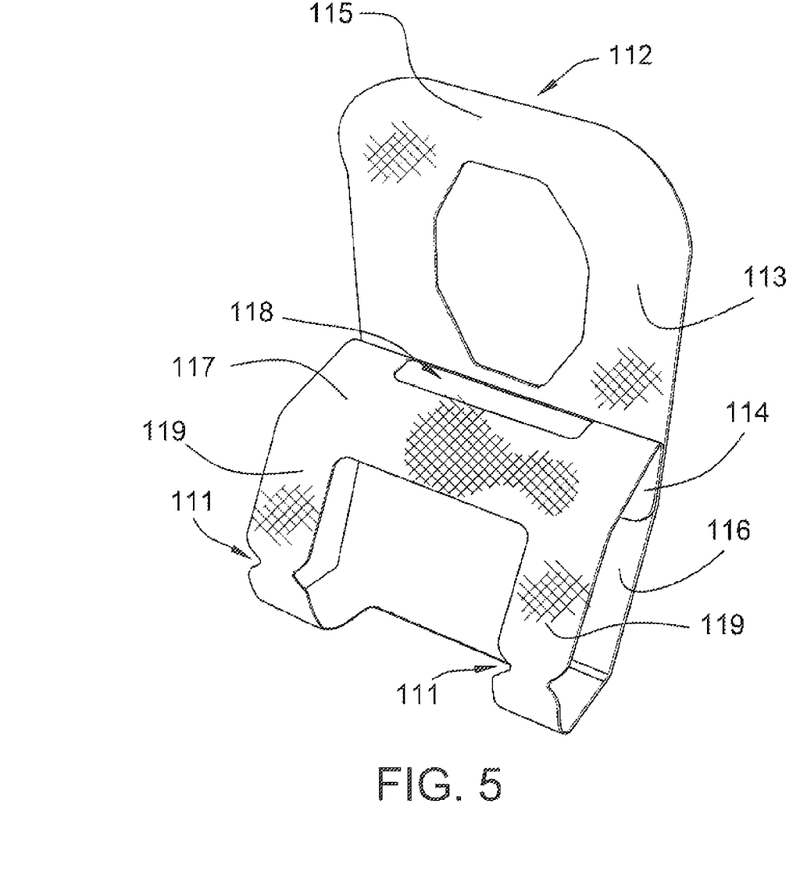
FIG. 5 is a front perspective view of the fabric member of the curtain air bag installation arrangement of the present disclosure.
Figure 6:
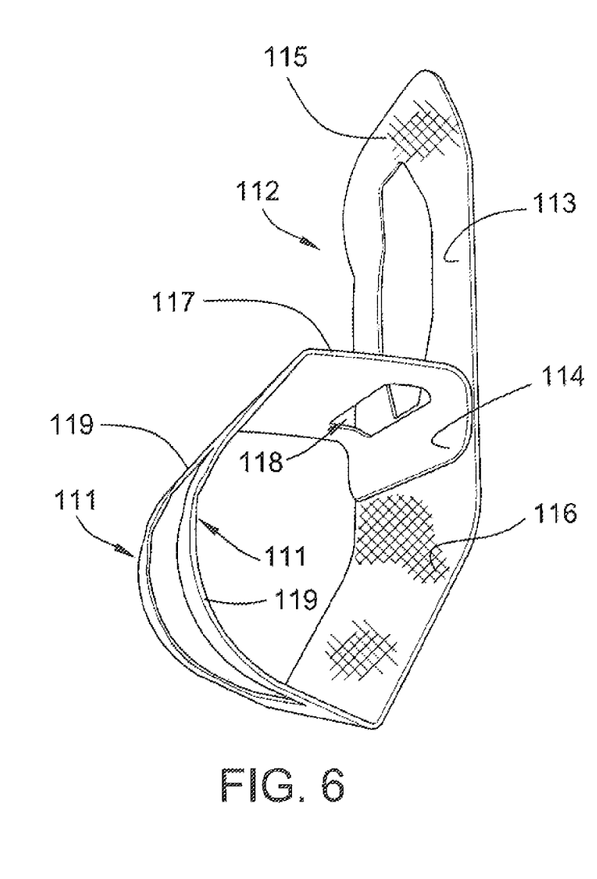
FIG. 6 is a further perspective view of the fabric member of FIG. 5.

Referring to FIGS. 5 and 6, the fabric member 112 may be made of suitable material such as polymeric non-woven fabric or other material. It must possess sufficient strength to support the air bag 110 as installed in a vehicle, and be sufficiently frangible to rupture efficiently on air bag deployment.

Fabric member 112 is an elongate flexible strap configured to support air bag 110 at each connecting point upon a hanger bracket 125. At a proximal end, it includes a securement pad portion 113 having a width and general shape complimentary to the securement flange portion 129 of hanger bracket 125. It has a central hole to permit passage through it of the fastener 149 during assembly of the curtain air bag 110 to a vehicle.

The central hole of the securement pad portion 113 forms a top cross web 115 configured to catch upon hook portion 131 of securement flange portion 129 to connect that end of the member 112 to the hanger bracket 125. The securement pad portion 113 generally defines a cushioning member interposed between the vehicle base plate 120 and securement flange portion 129 of hanger bracket 125 on installation of the curtain air bag.

Fabric member 112 forms a first plateau portion 116 that extends from a lower end of securement pad portion 113. It is solid fabric and arranged to overlie depending arm portion 136 of hanger bracket 125.

The end of fabric member 112 distal to the securement pad portion 113 includes a cross web 114 best seen in FIG. 6 adjacent to a second plateau portion 117. Second plateau portion 117 includes a securement flange portion receptacle or hole 118 sized to pass the securement flange portion 129 of hanger bracket 125. The second plateau portion 117 is configured to overlie the ledge portion 135 of hanger bracket 125 on installation of the curtain air bag.

A pair of frangible strips 119 connect the first and second plateau portion 116 and 117. As illustrated, these strips may include notches 111 which implement fracture of the strips on air bag deployment. The length of the strips 119 is such that the plateau portions 116 and 117 and strips 119 form a snug band around the curtain air bag 110 at each hanger bracket 125. The hanger bracket 125 and fabric member 112 form the hanger bracket assembly 124 which is affixed to vehicular base plate 120 on installation of the curtain airbag 110.

The hanger bracket 125 and fabric member 112 are combined as illustrated in FIG. 1 to form hanger assembly 124 to support curtain air bag 110 within the cradle defined by outwardly directed ledge portion 135 and depending arm portion 136.

The securement flange portion 129 of hanger bracket 125 is inserted through securement flange portion receptacle 118 to connect distal end of the fabric member 112 to the hanger bracket 125. With second plateau portion 116 positioned resting on ledge portion 135 of hanger bracket 125 straps 119 are wrapped around the exterior of rolled air bag 110. The cross web 115 of securement pad portion 113 is placed over hook portion 131 to secure it to the hanger bracket portion. The fabric member 112 is thus secured to hanger bracket 125 with first plateau portion 117 overlying depending arm portion 136 and securement pad portion 113 positioned along the back surface of securement flange portion 129 (See FIGS. 1 and 2). Curtain air bag 110 is captured between the straps 119 of fabric member 112 and the cradle defined by ledge portion 135 and depending arm portion 136 of hanger bracket 125. The cross web 114 at the distal end of fabric member 112 resides between the back of depending arm portion 136 and first plateau portion 116 of fabric member 112.

The energy absorbing rotatable fastener 149 of the present disclosure is similar in structure and function to the quarter-turn fastener disclosed and claimed in the International Application Publication No. WO 2012/129471 A2, published Sep. 27, 2012, and entitled "Verification Arrangement for Fastener System" (US 2014/0017036 A1, published Jan. 16, 2014).

Fastener 149 is configured to attach hanger assembly 124 to base plate 120 by insertion of a portion of the fastener through hole 128 in hanger bracket 125, central hole in securement pad portion 113 of fabric member 112 and through hole 122 in base plate 120 followed by rotation of fastener 149 ninety degrees (one quarter-turn) to a locked or secured position. When so positioned, the fastener securely affixes the hanger bracket 125 to base plate 120 and additionally provides energy absorbing capability to dissipate energy of airbag deployment.

Figure 7:
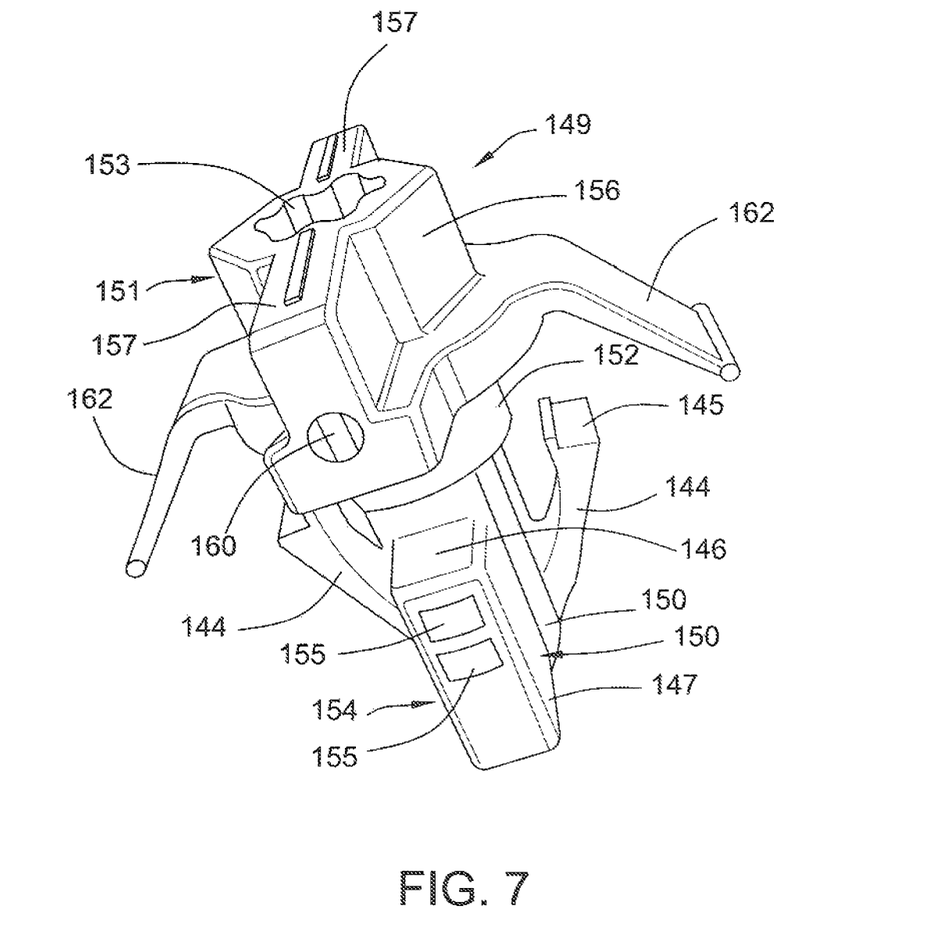
FIG. 7, is a front perspective view of the energy absorbing quarter-turn fastener of the present disclosure.

Fastener 149, seen in FIG. 7, has a molded polymeric body comprising a rear attachment portion 150 and a forward head portion 151 joined by a central shaft portion 152.

The head portion 151 defines an elongate grip 157 for manual manipulation. As illustrated, the central portion of head portion 151 may optionally include an internal configuration 153 and/or an external configuration 156 making it possible to utilize appropriate hand, or powered tools to rotate the fastener 149 during installation.

Radial wings 162 extend laterally from head portion 151. The wings 162 are configured to extend in the direction of insertion. During insertion of rear attachment portion 150 the free ends of wings 162 contact the front surface of hanger bracket securement flange portion 129, and deform to act as cantilever leaf springs to urge the fastener outward in the direction opposite the direction of insertion.

The attachment portion 150 is cruciform shaped and includes long bars 147 and short bars, or fingers 144. The long bars include planar abutment surfaces 146 arranged to contact the rear surface 123 of base plate 120 when fastener 149 is in the locked position. The long bars 147 comprise energy absorbing structure 154. Each bar 147 includes a series of voids 155 along its exterior edge which contribute to its energy absorbing characteristics.

The interior of fastener 149 may include a metal core 160 to provide requisite strength to the fastener to resist the forces associated with air bag deployment. The core 160 extends between head portion 151 and attachment portion 150. The core may, for example, be formed of a zinc casting or a steel stamping. The shell or cover surrounding the core is overmolded and made of an energy absorbing polymeric material such as polycarbonate/acrylonitrile butadiene styrene (PC/ABS).

In the embodiment disclosed, the short bars 144 take the form flexible fingers cantilevered from the distal end of attachment portion 150 which diverge toward head portion 151. The free ends of the fingers 144 are spaced apart laterally a distance somewhat longer than the length of the short slot of the cruciform hole 128 in hanger bracket 125. The laterally outer edges of the fingers taper to converge in the direction of insertion to assist in passage through the short slot 132 of hole 128 in hanger bracket 125. The free ends of the fingers include seats 145 which are configured to rest upon the back surface of securement flange portion 129 at the outer terminus of the short slots 132 in hanger bracket 125.

On insertion of the attachment portion 150 into the hole 128 of hanger bracket 125, the cantilevered fingers 144 are deformed toward each other to pass through the short slot. The fingers 144 surpass the hole 128 and spring laterally outward behind the back surface of securement flange portion 129 of hanger bracket 125. At that position, the wings 162 are in contact with the front surface of the hanger bracket 125 and deformed sufficiently to urge the fastener 149 in the direction outward, opposite the direction of insertion.

The seats 145 of fingers 144 abut the rear surface of hanger bracket 125 and retain the fastener on hanger bracket 125. Importantly, in this manner, the fastener 149 may be preassembled to hanger bracket 125 by the manufacturer of the airbag for later installation into a vehicle by the vehicle manufacturer. The sub-assembly supplied for installation into a vehicle would comprise rolled air bag 110 with spaced hanger assemblies 124. Each hanger assembly would include a fastener 149 affixed in cruciform shaped hole 128.

Installation of the curtain airbag into a vehicle is accomplished by insertion of fastener 149 on each hanger bracket 125 into fastener receptacle hole 122 in a plate 120. The fastener 149 is inserted against the opposing force of wings 162 sufficiently for abutment surfaces 146 of long bars to surpass the rear surface of base plate 120. The fastener 149 is rotated ninety degrees (90°) or one-quarter-turn to position abutment surfaces 146 of long bars 147 against the rear surface 123 of base plate 120 placing the energy absorbing structure of bars 154 in operative position. The abutment surfaces are held in position by the restoring force imparted by the deformed wings 162. To effect such rotation one wing 162 of head portion 150 deforms outwardly to surpass locked position retention stop surface 134. Notably, securement pad portion 113 of fabric member 112 is positioned between the front surface 121 of base plate 120 and the rear surface of securement flange portion of hanger bracket 125. The member thus acts as a cushion to reduce vibration and noise. Tabs 127 are engaged within long slot 117 of base plate 120 and prevent rotation of the hanger assembly 124 relative to the base plate.

As illustrated in FIG. 1 in the energy absorbing position, one of radial wings 162 is positioned between locked position limit stop surface 133 and locked position retention stop surface 134. The fastener is thus restricted from dislodgement from its energy absorbing position. To rotate the fastener 149 to a position where the attachment portion may be withdrawn from the hole 122 in base plate 120, it is necessary to manually deform the radial wing 162 to surpass one of the stop surfaces 133 or 134. The fastener 149 may then be rotated 90° to align long bars 147 with long slots 130 and the fastener removed for servicing of the air bag assembly or replacement of the fastener component.

Figure 8:
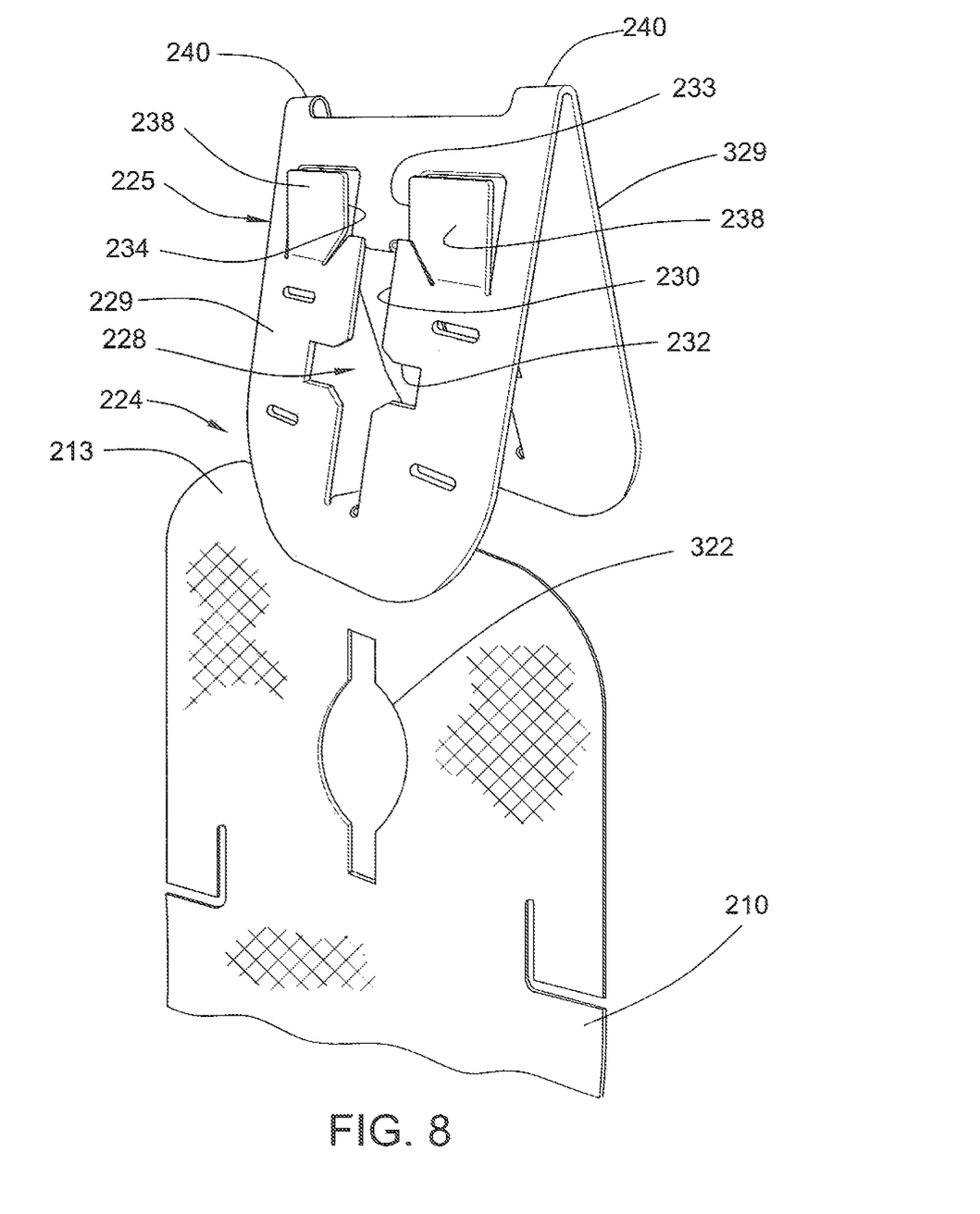
FIG. 8 is an exploded view of a modified form of hanger assembly of the attachment arrangement of FIG. 1.
Figure 9:
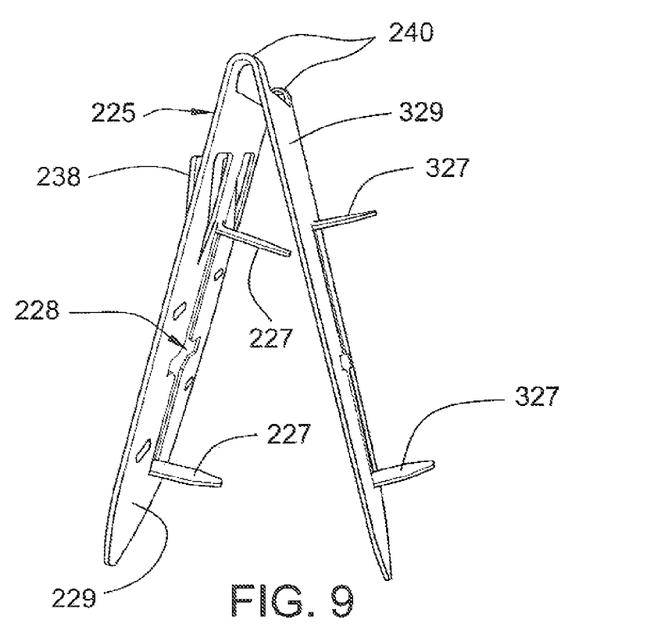
FIG. 9 is a side perspective of the hanger bracket of the hanger assembly of FIG. 8.
Figure 10:
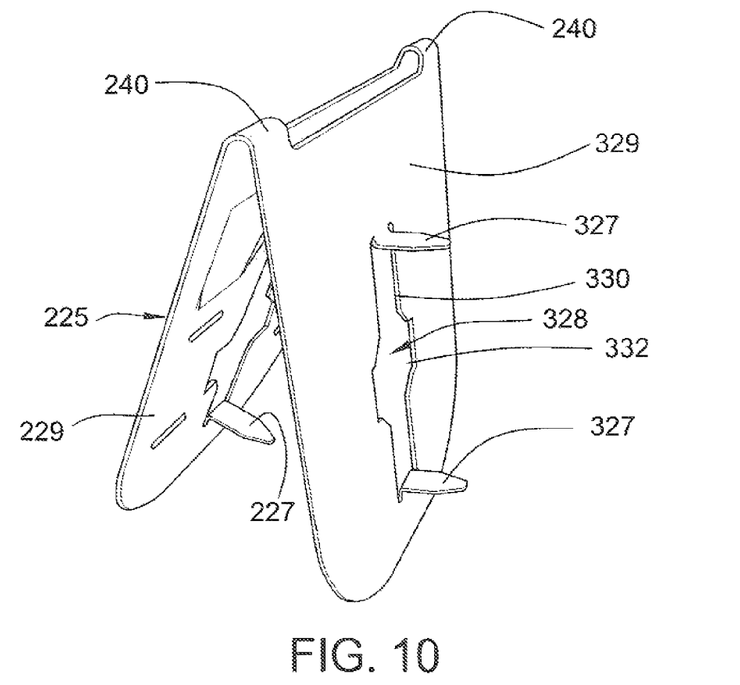
FIG. 10 is a side perspective of the hanger bracket of the hanger assembly of FIG. 9 from a somewhat different viewing angle.

Turning now to FIGS. 8 to 10 there is illustrated another form of hanger assembly designated 224. As best seen in FIG. 9, it includes a hanger bracket 225 and a fabric member attached to, or integral with, a side curtain air bag 210.

In this embodiment hanger bracket 225 is a metal stamping having and forward planar securement flange portion 229 and a rearward planar securement flange portion 329 connected by integrally formed links 240.

Forward planar securement flange portion 229 includes a central cruciform shaped hole 228 defined by intersecting long slot 230 and short slot 232. Tabs 227, seen in FIGS. 9 and 10 extend in the direction of fastener insertion at opposite distal ends of long slot 230.

Forward planer securement flange portion 229 includes forwardly bent tangs 238 defining locked position limit stop surface 233 and locked position retention stop surface 234. These stop surfaces function as described in connection with the stop surfaces 133 and 134 of the embodiment of FIGS. 1 to 7 and as discussed further below.

Rearward planer securement flange portion 329 includes a central cruciform shaped hole 328 shaped substantially similar to the central cruciform hole 228 in the forward planer securement flange portion 229. It includes intersecting long slot 330 and short slot 332. Tabs 327 extend inward, in the direction of fastener insertion, at opposite distal ends of long slot 330.

In this embodiment the fabric member takes the form of fabric securement pad 213 which is sized somewhat larger than the planer securement flange portions 229 and 329. It includes an elongate central hole, or aperture 322, sized to permit passage of the tabs 227 of forward planer securement flange portion 229 during assembly of the hanger assembly. Cruciform shaped holes 228 and 328 and central hole or aperture 322 are configured to permit passage of the attachment portion 150 of fastener 149 illustrated in FIG. 7, during attachment of a curtain air bag 210 to a vehicular base plate 120.

Hanger assembly 224 of FIGS. 8 to 10 is assembled by placement of securement pad 213 between the forward planar securement flange portion 229 and rearward planar securement flange portion 329 of hanger bracket 225 and compressing the securement pad 213 between the separate securement flange portions. In forming that connection, the tabs of forward planar securement flange portion 227 pass through the hole 322 in securement pad 213 and into the long slot 330 of rearward planar securement flange portion 329 to overlay the tabs 327. The hanger bracket 225 is thus connected to the securement pad 213 to form the illustrated hanger assembly 224. This relationship is maintained by the deformation of the metal links 240. As in the embodiment of FIGS. 1 to 7 the tabs 227 and 327 extend in the direction of fastener insertion and an attachment of the hanger assembly 224 to base plate 120 engage long slot 117 and prevent rotation of the hanger assembly 224 relative to base plate 120.

Notably, while the hanger assembly 224 illustrated in FIGS. 8 to 10 includes a hanger bracket made of metal it is contemplated that such a hanger bracket could be made of molded plastic and include all of the features described above.

As in the embodiment of FIGS. 1 to 7 a quarter-turn fastener such as fastener 149 shown in FIG. 7 is used to attach curtain air bag 210 to vehicular base plate 120 in the same manner as described in connection with the embodiment of FIGS. 1 to 7.

Similarly, the locked position limit stop surface 233 and locked position retention stop surface 234 capture one of the wings 162 to prevent rotation of the fastener 149 from its locked position (as illustrated by FIG. 1). To remove the fastener 149 it is necessary to deform radial wing 162 to surpass one of the limit stop surfaces and rotate the long bars 147 into alignment with long slot 117 of base plate 120 and long slots 230 and 330 of hanger bracket 225.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

The invention claimed is:

1. A quarter-turn fastener and hanger assembly for connection to a base plate having a fastener receiving receptacle, said hanger assembly including a hanger bracket having a fastener receiving hole, wherein said hanger bracket includes at least one forwardly bent tang defining a locked position limit stop surface;
   said fastener including a body rotatable between an insertion position for connection to the base plate and a locked position releasably securing said hanger bracket to the base plate;
   a head portion to move said fastener between said insertion position and said locked position;
   an attachment portion sized to pass through said fastener receiving hole in said hanger bracket and the fastener receptacle in the base plate;
   said attachment portion including at least one abutment surface to abut the back surface of the base plate in said locked position,
   said head portion includes deformable resilient arms extending laterally outward and toward said attachment portion with ends to engage a front face of said hanger bracket to urge said at least one abutment surface into abutting relation to the back surface of the base plate, wherein one of said deformable resilient arms abuts said locked position limit stop surface to prevent rotation from said locked position,
   wherein said hanger assembly further includes a fabric member connected to said hanger bracket and to a supported element.

2. A quarter-turn fastener and hanger assembly as claimed in claim 1,
   wherein said at least one forwardly bent tang defines a locked position retention limit stop surface and one of said deformable resilient arms abuts said locked position limit retention stop surface to prevent rotation from said locked position.

3. A quarter-turn fastener and hanger assembly as claimed in claim 1,
   wherein said hanger bracket is made of metal.

4. A quarter-turn fastener and hanger assembly for connection to a base plate having a fastener receiving receptacle, said hanger assembly including a hanger bracket having a fastener receiving hole, wherein said hanger bracket includes at least one forwardly bent tang defining a locked position retention limit stop surface;
   said fastener including a body rotatable between an insertion position for connection to the base plate and a locked position releasably securing said hanger bracket to the base plate;
   a head portion to move said fastener between said insertion position and said locked position;
   an attachment portion sized to pass through said fastener receiving hole in said hanger bracket and the fastener receptacle in the base plate;
   said attachment portion including at least one abutment surface to abut the back surface of the base plate in said locked position,
   said head portion includes deformable resilient arms extending laterally outward and toward said attachment portion with ends to engage a front face of said hanger bracket to urge said at least one abutment surface into abutting relation to the back surface of the base plate, wherein one of said deformable resilient arms abuts said locked position limit retention stop surface to prevent rotation from said locked position,
   wherein said hanger assembly further includes a fabric member connected to said hanger bracket and to a supported element.

5. A quarter-turn fastener and hanger assembly for connection to a base plate having a fastener receiving receptacle, said hanger assembly including a hanger bracket having a fastener receiving hole, wherein said hanger bracket defines a hook and includes an outwardly directed ledge portion and a depending arm portion defining a cradle;
   said fastener including a body rotatable between an insertion position for connection to the base plate and a locked position releasably securing said hanger bracket to the base plate;
   a head portion to move said fastener between said insertion position and said locked position;
   an attachment portion sized to pass through said fastener receiving hole in said hanger bracket and the fastener receptacle in the base plate;
   said attachment portion including at least one abutment surface to abut the back surface of the base plate in said locked position,
   said head portion includes deformable resilient arms extending laterally outward and toward said attachment portion with ends to engage a front face of said hanger bracket to urge said at least one abutment surface into abutting relation to the back surface of the base plate,
   wherein said hanger assembly further includes a fabric member connected to said hanger bracket and to a supported element that is configured to be received by said cradle.

6. A quarter-turn fastener and hanger assembly as claimed in claim 5,
   wherein said fabric member includes a securement pad portion defining a cushioning member interposed between said hanger bracket and the base plate.

7. A quarter-turn fastener and hanger assembly as claimed in claim 6,
   wherein said securement pad portion includes a top cross web connected to said hook of said hanger bracket.

8. A quarter-turn fastener and hanger assembly as claimed in claim 7, wherein said fabric member includes a pair of frangible strips surrounding said supported element.

9. A quarter-turn fastener and hanger assembly as claimed in claim 8, wherein said supported element is a curtain air bag.

10. A quarter-turn fastener and hanger assembly as claimed in claim 6,
    wherein said hanger bracket includes at least one forwardly bent tang defining a locked position limit stop surface and one of said deformable resilient arms abuts said locked position limit stop surface to prevent rotation from said locked position.

11. A quarter-turn fastener and hanger assembly as claimed in claim 10,
    wherein said at least one forwardly bent tang defines a locked position retention limit stop surface and one of said deformable resilient arms abuts said locked position limit retention stop surface to prevent rotation from said locked position.

12. A quarter-turn fastener and hanger assembly as claimed in claim 6,
    wherein said hanger bracket includes at least one forwardly bent tang defining a locked position retention limit stop surface and one of said deformable resilient arms abuts said locked position limit retention stop surface to prevent rotation from said locked position.

13. A quarter-turn fastener and hanger assembly as claimed in claim 5,
wherein said forward planar securement flange portion includes tabs extending in the direction of fastener insertion at opposite distal ends of said long slot of said cruciform shaped fastener receiving hole.

14. A quarter-turn fastener and hanger assembly for connection to a base plate having a fastener receiving receptacle, said hanger assembly including a hanger bracket having a fastener receiving hole, wherein said hanger bracket includes a forward planar securement flange portion and a rearward planar securement flange portion connected by at least one integrally formed link, each said planar securement flange portion including a cruciform shaped fastener receiving hole defined by an intersecting long slot and short slot;
 said fastener including a body rotatable between an insertion position for connection to the base plate and a locked position releasably securing said hanger bracket to the base plate;
 a head portion to move said fastener between said insertion position and said locked position;
 an attachment portion sized to pass through said fastener receiving hole in said hanger bracket and the fastener receptacle in the base plate;
 said attachment portion including at least one abutment surface to abut the back surface of the base plate in said locked position,
 said head portion includes deformable resilient arms extending laterally outward and toward said attachment portion with ends to engage a front face of said hanger bracket to urge said at least one abutment surface into abutting relation to the back surface of the base plate,
 wherein said hanger assembly further includes a fabric member connected to said hanger bracket and to a supported element.

15. A quarter-turn fastener and hanger assembly as claimed in claim 14,
wherein said hanger bracket includes a pair of links connecting said forward planar securement flange portion and said rearward planar securement flange portion,
and wherein said fabric member includes a securement pad disposed between said forward planar securement flange portion and said rearward planar securement flange portion and said securement pad includes a fastener receiving hole.

16. A quarter-turn fastener and hanger assembly as claimed in claim 14,
wherein said rearward planar securement flange portion includes tabs extending in the direction of fastener insertion at opposite distal ends of said long slot of said cruciform shaped fastener receiving hole.

17. A quarter-turn fastener and hanger assembly as claimed in claim 14,
wherein said hanger bracket includes at least one forwardly bent tang defining a locked position limit stop surface and one of said deformable resilient arms abuts said locked position limit stop surface to prevent rotation from said locked position.

18. A quarter-turn fastener and hanger assembly as claimed in claim 14,
wherein said hanger bracket includes at least one forwardly bent tang defining a locked position retention limit stop surface and one of said deformable resilient arms abuts said locked position limit retention stop surface to prevent rotation from said locked position.

19. A quarter-turn fastener and hanger assembly as claimed in claim 18,
wherein said at least one forwardly bent tang defines a locked position limit stop surface and one of said deformable resilient arms abuts said locked position limit stop surface to prevent rotation from said locked position.

\* \* \* \* \*